United States Patent [19]

DeBons

[11] Patent Number: 4,756,370

[45] Date of Patent: Jul. 12, 1988

[54] LIGNIN AMINE SURFACTANT SYSTEM FOLLOWED BY SEQUENTIAL POLYMER SLUGS

[75] Inventor: Francis E. DeBons, Richmond, Tex.

[73] Assignee: Texaco Inc., White Plains, N.Y.

[21] Appl. No.: 34,863

[22] Filed: Apr. 6, 1987

[51] Int. Cl.$^4$ .............................................. E21B 43/22
[52] U.S. Cl. .................... 166/273; 252/8.554
[58] Field of Search ................. 166/273–275; 252/8.554

[56]  References Cited

U.S. PATENT DOCUMENTS

| | | | |
|---|---|---|---|
| 3,373,107 | 3/1968 | Rice et al. ...................... | 166/275 X |
| 3,476,188 | 11/1969 | Harvey ........................... | 166/275 X |
| 3,707,187 | 12/1972 | Knight ............................ | 166/273 X |
| 3,724,545 | 4/1973 | Knight ............................ | 166/273 |
| 4,011,910 | 3/1977 | Rhudy et al. .................. | 166/274 |
| 4,133,385 | 1/1979 | Kalfoglou ...................... | 166/273 |
| 4,344,487 | 8/1982 | Kalfoglou ...................... | 166/273 X |
| 4,438,002 | 3/1984 | Schievelbein ................. | 166/274 X |
| 4,444,262 | 4/1984 | Haskin et al. .................. | 166/274 |
| 4,548,721 | 10/1985 | DeBons et al. ................. | 252/8.554 |
| 4,611,659 | 9/1986 | DeBons et al. ................. | 166/274 |
| 4,667,740 | 5/1987 | Maddox, Jr. .................. | 252/8.554 X |

Primary Examiner—George A. Suchfield
Attorney, Agent, or Firm—Jack H. Park; Kenneth R. Priem; Harold J. Delhommer

[57]  ABSTRACT

The invention is a method of recovering hydrocarbons from an underground hydrocarbon formation penetrated by at least one injection well and at least one production well, which employs the steps of injecting a lignin amine surfactant slug, injecting an aqueous buffer slug of low salinity containing a polyacrylamide, injecting a high salinity aqueous drive fluid with polysaccharide, and recovering hydrocarbons and other fluids from the formation through a production well. The lignin amine surfactant slug is comprised of lignin, a primary amine having about 8 to about 18 carbon atoms and a sulfonate surfactant having an equivalent weight between about 200 and about 400 in the relative concentrations of about 1% to about 20% by weight of amine, about 10% to about 80% by weight of lignin, and about 10% to about 75% by weight of sulfonate surfactant.

11 Claims, No Drawings

LIGNIN AMINE SURFACTANT SYSTEM FOLLOWED BY SEQUENTIAL POLYMER SLUGS

BACKGROUND OF THE INVENTION

The invention relates to the recovery of oil from subterranean formations by surfactant flooding operations. More particularly, the invention concerns the use of a surfactant flooding system wherein the surfactant slug is followed by a low salinity polyacrylamide buffer slug which is followed by a drive fluid containing polysaccharides.

Investigations of ways to increase oil recovery by improving the displacement ability of a water flood have produced useful surfactants which reduce the interfacial tension between the oil and water in the reservoir. With lower interfacial tension, oil that is trapped in the pore structure can disperse into the water as smaller and more easily deformable droplets. Many types of surfactants have been investigated and the choice of which surfactant to employ in a water flood operation is dependent upon the conditions in the reservoir, as well as the cost and availability of the surfactants.

Most water flood operations have employed a petroleum sulfonate as a sole surfactant, or at least a major component of a mixture of surfactants. Synthetic alkylaryl sulfonates and alkyl sulfonates and sulfates have been proposed as oil recovery surfactants. Sulfonates are preferred because they have a better high temperature stability than the sulfates. These surfactants are all classified as organic sulfonates and are usually metal salts of alkylbenzene sulfonate containing 12 to 30 carbon atoms, but may also be aliphatic sulfonates or alkylated naphthalene sulfonates. These surfactants have an equivalent weight that ranges from 320 to 700 g/mole.

To combat layering and precipitation problems in high salinity applications, a material with both water-soluble and oil soluble characteristics is usually added to organic sulfonate surfactant mixtures. When used in surfactant flooding, these materials are generally referred to as "solubilizers" and often constitute the most expensive component in a surfactant mixture. Conventional solubilizers are sulfate or sulfonate salts of polyethoxylated alcohols or alkyl phenols. The amount of solubilizer required depends on the amount of and types of organic sulfonate surfactants employed in the water flood operation. A minimum amount of solubilizer is required to prevent the surfactants from precipitating from the flood water. The choice of the solubilizer employed is dependent on the choice of surfactants to be used and the salinity of the flood water. Surfactant quantity is a function of the reservoir's size and other characteristics. The concentration of surfactant components in the system is usually 1% to 6% expressed on an active surfactant basis.

Generally, a surfactant slug is followed by a polymer drive fluid. It is also known to inject the polymer drive fluid in blocks having varying polymer concentrations and varying viscosities. U.S. Pat. No. 3,467,187 discloses the use of a surfactant displacement slug and a mobility buffer with graded viscosity zones injected between the surfactant and the drive fluid. U.S. Pat. Nos. 3,500,924 and 3,507,331 disclose the use of a mobility buffer fluid between the surfactant slug and the drive fluid wherein the front part of the mobility buffer fluid contains sufficient surfactant to emulsify with the back of the surfactant slug and a viscosity in the rear of the mobility buffer fluid to match up with the viscosity of the front of the drive fluid.

U.S. Pat. Nos. 3,707,187; 4,074,759; 4,099,569 and 4,100,966 all disclose varying the concentration of a surfactant in a polymer slug for mobility control, wherein the surfactant concentration is tapered. U.S. Pat. No. 3,670,818 describes following a surfactant slug with alternate aqueous slugs containing first a mobility reducing agent, then slugs of water, and then a drive fluid. The general idea behind all of these disclosures is to provide for compatible viscosities between adjacent slugs to reduce fingering between slugs and increase recovery efficiency.

SUMMARY OF THE INVENTION

The invention is a method of recovering hydrocarbons from an underground hydrocarbon formation penetrated by at least one injection well and at least one production well, which employs the steps of injecting a lignin amine surfactant slug, injecting an aqueous buffer slug of low salinity containing a polyacrylamide, injecting a high salinity aqueous drive fluid with polysaccharide, and recovering hydrocarbons and other fluids from the formation through a production well. The lignin amine surfactant slug is comprised of lignin, a primary amine having about 8 to about 18 carbon atoms and a sulfonate surfactant having an equivalent weight between about 200 and about 400 in the relative concentrations of about 1% to about 20% by weight of amine, about 10% to about 80% by weight of lignin, and about 10% to about 75% by weight of sulfonate surfactant.

DETAILED DESCRIPTION

Surfactant systems are conventionally injected into a reservoir to form a surfactant slug front followed by the injection of additional brine or water which may contain a mobility control agent. The surfactant slug of such a system may be between 0.05 to about 0.5 pore volumes, and preferably between about 0.1 to about 0.3 pore volumes in size. A typical surfactant system may contain (1) one or more petroleum sulfonates such as a water-soluble sulfonate having a relatively low equivalent weight, an oil soluble sulfonate having a relatively high equivalent weight or any other commercially available petroleum sulfonates; (2) a solubilizer or co-surfactant; (3) brine; and optionally, (4) a light hydrocarbon.

Because brine is readily available in the oil field, it is clearly the aqueous solvent of choice. Although surfactant systems may perform better in fresh water with a relatively low salinity, economics mandate the use of field brines wherever possible. Consequently, surfactant systems are tailored to provide acceptable recoveries with the use of a brine solvent.

Most enhanced oil recovery surfactant systems have fresh water polymer drives. This is despite the extra cost associated with injecting large quantities of fresh water instead of brine. Most surfactant systems require the salinity gradient provided by a fresh water polymer drive for optimum oil recovery. Generally, the recovery efficiency of produced oil is greatly diminished by the use of a less expensive high salinity polymer drive.

The present invention proposes the use of a surfactant system wherein a high salinity polymer drive may be used to push an efficient surfactant slug through a hydrocarbon formation while still achieving high recovery efficiencies. The invention requires the injection of about 0.05 to about 0.5, preferably about 0.1 to about 0.3 pore volumes of a surfactant slug. A conventional petroleum sulfonate surfactant system may be used as well as other surfactant formulations.

One preferred surfactant system for use with the invention comprises a lignin, an amine, and a petroleum or synthetic sulfonate surfactant. A solubilizer or a cosurfactant may be optionally employed. These active components should be present in the surfactant slug in a concentration of about 0.1% to about 6% by weight.

Component concentrations are usually expressed as a relative percent of the total active surfactant in the system. The lignin should be present in the relative concentration of about 10% to about 80% by weight, preferably about 20% to about 60% by weight, and may be a modified kraft lignin usually oxidized or sulfonated, although a lignosulfonate is preferred. A non-modified kraft lignin is not effective since it lacks water solubility. As used herein, the term lignin refers to those modified lignins which are effective in the invention system.

The amine is a primary amine having about eight to about eighteen carbon atoms. Tallow amine is preferred. It should be present in the relative concentration of about 1% to about 20% by weight, preferably about 4% to about 11% by weight. The lignin/amine components of the system are present in a cumulative relative concentration of about 20% to about 85%.

The surfactant slug must also contain about 10% to about 75% by weight (relative concentration), preferably about 40% to about 70% by weight of a water-soluble surfactant, such as a synthetic or petroleum sulfonate surfactant having a relatively low equivalent weight of about 200 to about 400. They may function as a cosurfactant or solubilizer. An additional cosurfactant or solubilizer may also be employed depending upon the formation desired to be flooded and the system characteristics.

Under some applications, the novel lignin/amine surfactant systems require a fresh water polyacrylamide drive to give oil recoveries equal to conventional petroleum sulfonate surfactant systems. The systems do not perform as well when polysaccharide drive fluids are used. But when such a lignin/amine slug is followed by a low salinity buffer slug containing polyacrylamide before the polysaccharide polymer drive fluid, recovery efficiencies are not hindered by the use of a high salinity brine drive fluid containing polysaccharide. The term polyacrylamide when used herein and in mobility control applications for enhanced oil recovery refers to copolymers of acrylamide and acrylic acid and similar polymers.

The aqueous buffer slug should be about 0.1 to about 0.5 pore volumes, preferably about 0.1 to about 0.3 pore volumes in size. The buffer slug should be of a relatively low salinity of less than about 1500 ppm TDS and less than about 150 ppm of divalent metal ions such as calcium and magnesium. The buffer slug may contain higher salinities up to about 4000 ppm TDS and about 200 ppm of divalent metal ions. However, higher salinity in the buffer slug may decrease the recovery efficiency of the surfactant system. The viscosity of the buffer slug should be chosen in the usual manner for surfactant and polymer flooding. The concentration of polyacrylamide in the buffer solution preferably will fall within the range of about 0.01% to about 1% by weight, depending upon the water salinity and the viscosity required.

An aqueous drive fluid comprising about 0.01% to about 0.5% by weight of polysaccharide is injected into the formation after the low salinity aqueous buffer slug. To save costs, the aqueous drive fluid should be formulated with the high salinity fluid available in the field. Preferably, the salinity will be higher than 4000 ppm TDS and 200 ppm divalent ions and will probably be much higher. The viscosity should approximately match the viscosity of the first polymer slug. At least 0.2 pore volumes of drive fluid must be injected. Larger quantities of drive fluid are preferred.

The following examples will further illustrate the novel polymer drive system of the present invention. These examples are given by way of illustration and not as limitations on the scope of the invention. Thus, it should be understood that the composition and amounts of the various surfactant and polymer slugs may be varied to achieve similar results within the scope of the invention.

EXAMPLES 1-7

Berea sandstone corefloods were performed in cells measuring $2'' \times 2'' \times 12''$. The corefloods used an injection brine of 68,000 ppm TDS and about 3700 ppm of divalent ions. A Southern Illinois crude having an API gravity of about 37° was employed. The surfactant floods were performed on cores flooded to residual water saturation at room temperature with a 1 ft/day frontal advance for the surfactant flood.

The surfactant slug employed was a 0.2 pore volume slug formulated in the injection brine containing: 0.3% of Adogen 170, a trademarked tallow amine sold by Sherex Chemical Co., 0.81% Lignosite 458, a trademarked softwood lignosulfonate sold by Georgia Pacific Corp., 1.35% TRS-40, a trademarked petroleum sulfonate having an equivalent weight of about 340 sold by Witco Chemical Co., and 0.54% LN-60COS, a trademarked ethoxylated anionic surfactant sold by Texaco Chemical Co. The polymers employed were Flocon 4800M, a trademarked xanthan polysaccharide sold by Pfizer and NalFlo 550, a trademarked polyacrylamide sold by Nalco Chemical Co.

Seven runs were performed with varying buffer slugs and polymer drive fluids. A simulated fresh water was employed containing about 330 ppm TDS salinity and about 80 ppm divalent ion concentration. The results are summarized below in Table I.

TABLE I

| Examples | Buffer, Vp | Polymer Drive | $E_R$, % |
| --- | --- | --- | --- |
| 1 | none | N550/fresh water | 78 |
| 2 | none | 4800M/fresh water | 67 |
| 3 | N550/fresh, 0.2 | 4800M/fresh water | 81 |
| 4 | none | 4800M/brine | 9 |
| 5 | fresh water, 0.2 | 4800M/brine | 30 |
| 6 | N550/fresh, 0.2 | 4800M/brine | 68 |
| 7 | N550/fresh, 0.1 | 4800M/brine | 52 |

Table I shows the effect on recovery efficiency by changing from the NalFlo 550 polyacrylamide at 150 cp (0.15% polymer) to the Flocon 4800M polysaccharide at 150 cp (0.20% polymer). The recovery efficiency dropped from 78% to 67% of residual crude from Example 1 to Example 2. The use of a 0.2 pore volume buffer of polyacrylamide in fresh water restored the recovery efficiency in Example 3.

Since polyacrylamides are not effective viscosity enhancers in high salinity environments, a polysaccharide must be used in a high salinity aqueous drive fluid.

The use of the polysaccharide in the injection brine of 68,000 ppm TDS following the lignin/amine surfactant slug resulted in a recovery efficiency of only 9% in Example 4. The addition of a 0.2 pore volume slug of polyacrylamide in fresh water prior to the injection of the polysaccharide in brine raised the recovery efficiency back up to 68% in Example 6.

Example 5 shows that the beneficial effect of the buffer is not due exclusively to the fresh water, although an oil recovery increase from 9% to 30% occurred. Example 7 shows that a smaller buffer slug size of 0.1 pore volumes is beneficial (9% to 52% oil recovery increase). However, a buffer slug greater than 0.1 pore volumes is preferred.

EXAMPLES 8-10

A second, more conventional, petroleum sulfonate surfactant system was also employed to demonstrate the effectiveness of a polyacrylamide buffer at lower salinity followed by a polysaccharide drive. Table II illustrates the results for a 0.2 pore volume buffer with a 3% active surfactant system. The runs contained the relative concentrations of 36% TRS-18, 36% TRS-40 and 28% LN-60COS. TRS-18 is a trademarked petroleum sulfonate having an equivalent weight of about 500 sold by Witco Chemical Co.

TABLE II

| Example | Buffer, $V_p$ | Polymer Drive | $E_R$, % |
|---------|---------------|---------------|----------|
| 8 | none | 4800M/fresh water | 76 |
| 9 | none | 4800M/brine | 37 |
| 10 | N550/fresh, 0.2 | 4800M/brine | 58 |

Examples 8 and 9 show the severe oil recovery decrease which occurs with a conventional high salinity 3% active concentration petroleum sulfonate surfactant system when a full salinity (68,000 ppm TDS) polysaccharide drive is used. Example 10 shows the obvious beneficial effect of the instant invention on a conventional solubilized petroleum sulfonate surfactant system.

Many variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:
   injecting into the formation through an injection well about 0.1 to about 3.0 pore volumes of an aqueous surfactant slug having a concentration of about 0.1% to about 6.0% active component,
   said surfactant slug comprising lignosulfonate, a tallow amine and a sulfonate surfactant in the relative concentrations of about 4% to about 11% by weight of tallow amine, about 20% to about 60% by weight of lignin, and about 40% to about 70% by weight of a sulfonate surfactant relative to all active components in the surfactant slug,
   said sulfonate surfactant having an equivalent weight of about 200 to about 400;
   injecting into the formation about 0.1 to about 0.3 pore volumes of an aqueous buffer slug comprising about 0.01% to about 0.5% of polyacrylamide by weight, less than about 1500 ppm TDS of salinity and less than about 150 ppm of divalent metal ions;
   injecting into the formation at least 0.2 pore volumes of an aqueous drive fluid having a relatively high salinity comprising about 0.01% to about 0.5% of polysaccharide by weight; and
   recovering hydrocarbons and other fluids from the formation through a production well.

2. A method of recovering hydrocarbons from an underground hydrocarbon formation penetrated by at least one injection well and at least one production well, which comprises:
   injecting into the formation through an injection well about 0.05 to about 0.5 pore volumes of an aqueous lignin amine surfactant slug have a concentration of about 0.1% to about 6.0% active component,
   said lignin amine surfactant slug comprising lignin, a primary amine having about 8 to about 18 carbon atoms and a sulfonate surfactant having an equivalent weight between about 200 and about 400 in the relative concentrations of about 1% to about 20% by weight of amine, about 10% to about 80% by weight of lignin, and about 10% to about 75% by weight of sulfonate surfactant;
   injecting into the formation about 0.1 to about 0.5 pore volumes of an aqueous buffer slug comprising about 0.01% to about 1.0% of polyacrylamide by weight, less than about 4000 ppm TDS of salinity and less than about 200 ppm of divalent metal ions;
   injecting into the formation at least 0.2 pore volumes of a relatively high salinity aqueous drive fluid comprising about 0.01% to about 0.5% of polysaccharide by weight; and
   recovering hydrocarbons and other fluids from the formation through a production well.

3. The method of claim 2, wherein the lignin in the surfactant slug is lignosulfonate.

4. The method of claim 2, wherein the lignin in the surfactant slug is oxidized kraft lignin.

5. The method of claim 2, wherein the lignin in the surfactant slug is sulfonated kraft lignin.

6. The method of claim 2, wherein the amine is a tallow amine.

7. The method of claim 2, wherein the amine is present in a concentration of about 4.0% to about 11% relative to all active components in the surfactant slug.

8. The method of claim 2, wherein the lignin is present in a concentration of about 20% to about 60% relative to all active components in the surfactant slug.

9. The method of claim 2, wherein the sulfonate surfactant slug further comprises about 40% to about 70% of a sulfonate relative to all active components in the surfactant slug.

10. The method of claim 2, wherein the sulfonate surfactant is a petroleum sulfonate.

11. The method of claim 2, wherein the sulfonate surfactant is a synthetic sulfonate.

* * * * *

UNITED STATES PATENT AND TRADEMARK OFFICE
CERTIFICATE OF CORRECTION

PATENT NO. : 4,756,370
DATED : July 12, 1988
INVENTOR(S) : Francis Eugene Debons It is certified that error appears in the above-identified patent and that said Letters Patent is hereby corrected as shown below:

That portion of Claim 1, line 6 which reads about "0.1 to about 3.0 pore volumes" should read --about 0.1 to about 0.3--.

Signed and Sealed this

Twenty-ninth Day of November, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,756,370
DATED : July 12, 1988
INVENTOR(S) : FRANCIS EUGENE DEBONS It is certified that error appears in the above-identified patent and that said Letters Patent is hereby corrected as shown below:

In Col. 5, line 61, please substitute --lignosulfonate-- for "lignin".

Signed and Sealed this

Twelfth Day of May, 1992

Attest:

DOUGLAS B. COMER

*Attesting Officer*    Acting Commissioner of Patents and Trademarks